United States Patent [19]

Coonen et al.

[11] Patent Number: 5,290,359
[45] Date of Patent: Mar. 1, 1994

[54] APPARATUS FOR PRODUCTION OF A BATTERY PASTE

[75] Inventors: Matthew A. Coonen, Pewaukee; Ralph A. Petersen, West Allis; Conrad E. Weinlein, Mequon, all of Wis.

[73] Assignee: Globe-Union Inc., Milwaukee, Wis.

[21] Appl. No.: 804,845

[22] Filed: Dec. 6, 1991

Related U.S. Application Data

[62] Division of Ser. No. 357,007, May 25, 1989, Pat. No. 5,096,611.

[51] Int. Cl.$^5$ ............................................. B05C 11/00
[52] U.S. Cl. .................................... 118/712; 118/608; 118/600; 118/407; 118/506; 118/610; 422/225; 210/85; 210/143; 210/400; 210/401
[58] Field of Search ................. 422/225; 210/143, 85, 210/400, 401; 118/407, 600, 506, 610, 712, 608

[56] References Cited

U.S. PATENT DOCUMENTS

| | | |
|---|---|---|
| 1,572,586 | 2/1926 | Weir . |
| 2,159,226 | 5/1939 | Reid . |
| 2,165,944 | 7/1939 | Scott ............................ 422/225 |
| 2,182,479 | 12/1939 | Johnstone . |
| 2,717,903 | 9/1955 | Ruth ............................ 422/225 |
| 3,004,013 | 10/1961 | Kircher, Jr. et al. ........... 422/225 |
| 3,104,946 | 9/1963 | Veal ............................ 422/225 |
| 3,169,890 | 2/1965 | Voss et al. . |
| 3,194,685 | 7/1965 | Malloy . |
| 3,252,764 | 5/1966 | Bruno, Jr. .................... 422/225 |
| 3,384,458 | 5/1968 | McCarthy et al. ............. 422/225 |
| 3,449,166 | 6/1969 | Jache . |
| 3,734,694 | 5/1973 | McCoy ......................... 422/225 |
| 3,747,560 | 7/1973 | Roberts et al. ................. 118/230 |
| 3,765,943 | 10/1973 | Biagetti . |
| 3,887,693 | 6/1975 | Escriban Nevado et al. ...... 422/225 |
| 3,894,886 | 7/1975 | Pankow et al. ................ 118/410 |
| 3,942,433 | 3/1976 | Wohlfarter . |
| 3,974,026 | 8/1976 | Emson et al. . |
| 4,019,431 | 4/1977 | Bastgen . |
| 4,020,882 | 5/1977 | Foulkes . |
| 4,024,055 | 5/1977 | Blann . |
| 4,050,482 | 9/1977 | Ching et al. .................. 118/405 |
| 4,346,022 | 8/1982 | Wolcott et al. . |
| 4,388,210 | 6/1983 | Parker . |
| 4,475,453 | 10/1984 | Davis . |
| 4,501,669 | 2/1985 | Hakansson et al. . |
| 4,656,706 | 4/1987 | Mahato et al. . |
| 4,697,511 | 10/1987 | Davis et al. . |
| 4,705,602 | 11/1987 | Dahl . |
| 4,707,272 | 11/1987 | Kistler ......................... 210/709 |
| 4,758,372 | 7/1988 | Eirich et al. . |
| 4,867,886 | 9/1989 | Botkins, Jr. .................. 210/401 |
| 5,021,166 | 6/1991 | Torpey ......................... 210/400 |

FOREIGN PATENT DOCUMENTS

| | | |
|---|---|---|
| 196507 | 10/1986 | European Pat. Off. .......... 210/401 |
| 58-147961 | 9/1983 | Japan . |
| 59-99668 | 6/1984 | Japan . |
| 63-269456 | 11/1988 | Japan . |
| WO/8200258 | 2/1982 | PCT Int'l Appl. ............... 422/225 |
| 47030 | 6/1963 | Poland . |
| 2733f | 3/1964 | Poland . |
| 1526810 | 12/1989 | U.S.S.R. ....................... 422/225 |

OTHER PUBLICATIONS

McCabe, W. L. and Smith, J. C., "Unit Operations of Chemical Engineering" third edition, McGraw-Hill Book Company, 1976.

*Primary Examiner*—Gary W. Jones
*Assistant Examiner*—Todd J. Burns
*Attorney, Agent, or Firm*—Foley & Lardner

[57] ABSTRACT

A process for making a battery paste includes steps of forming an active material in an aqueous slurry, then dewatering the slurry to form a battery paste. In one described embodiment, a slurry containing one or more basic lead sulfates suitable for use as the active material in lead-acid battery electrodes is formed in a continuously stirred tank reactor (36). The slurry is withdrawn from the reactor (36) and fed to a belt press (67) which reduces the moisture content of the slurry to the desired level. Battery pastes produced according to the invention may be fed continuously to a paster (89) for mass production of positive and negative battery plates from grids (91).

12 Claims, 6 Drawing Sheets

APPARATUS FOR PRODUCTION OF A BATTERY PASTE

This is a division of U.S. Ser. No. 07/357,007 filed on May 25, 1989 now U.S. Pat. No. 5,096,611.

TECHNICAL FIELD

This invention relates to a process for producing battery paste for the manufacture of battery electrodes, particularly to a process for preparing positive and negative pastes for making lead-acid battery electrodes. The invention further provides an apparatus for carrying out such a process.

BACKGROUND OF THE INVENTION

Battery electrodes (plates) used in lead-acid batteries are made by applying a paste made of a lead compound to the surface of a battery plate and electro-chemically forming the paste into an active material. Such pastes typically contain lead, lead oxide(s), basic lead sulfate compounds, and water.

In general, the paste is made by adding sulfuric acid and water to a mixture of lead and lead oxide(s) to form basic lead sulfate compounds in a mixture with excess unreacted lead oxide and lead. According to one known process, this is done by first weighing out a predetermined amount of lead oxide into a weigh hopper and dumping the lead oxide into a batch mixer, such as a mulling mixer. Dry additives such as fiber and expander are directly added into the mixer. The resulting mixture is dry mixed for several minutes so that the fiber and expander are dispersed throughout the oxide. Water is then added as needed to make a paste of the desired consistency. Excessively moist or dry paste render pasting impossible. The wet mixture is mixed for a short time to wet out the lead oxide. Sulfuric acid is then added as mixing continues until the temperature peaks at about 65° C. and then drops to the range of 43°–49° C. The acid is added gradually to prevent the paste from overheating. The resulting paste is then cooled by evaporation of water and conduction to the mass of the mixer. Such a lead-acid battery paste is generally made in a batch reactor, although continuous processes have been suggested.

Many variations of this process have been proposed. In one method, a pre-sulfated paste material containing basic lead sulfate, e.g., tri- and tetrabasic lead sulfates ($3PbO \cdot PbSO_4 \cdot H_2O$ and $4PbO \cdot PbSO_4$), is made in dry form prior to forming the paste. See Malloy U.S. Pat. No. 3,194,685, issued Jul. 13, 1965, Johnstone U.S. Pat. No. 2,182,479, issued Dec. 5, 1939, and Weir U.S. Pat. No. 1,572,586, issued Feb. 9, 1926. Monobasic lead sulfate has also been used as a presulfated paste material. Large crystals of monobasic lead sulfate are formed by sulfurizing an aqueous solution of basic lead acetate with, for example, amido sulfonic acid. The monobasic lead sulfate product is then dried prior to its use in preparing a paste mix. See, for example, Voss et al. U.S. Pat. No. 3,169,890, issued Feb. 16, 1965.

Lead oxide has been reacted with ozone to form improved lead oxides useful as active materials in batteries, as described in Parker U.S. Pat. No. 4,388,210, issued Jun. 14, 1983 and Mahato et al., U.S. Pat. No. 4,656,706, issued Apr. 14, 1987. Persulphate treatments have also been used to convert lead oxide to lead dioxide in battery plates. See Reid U.S. Pat. No. 2,159,226, issued May 23, 1939.

In another process a reactor for continuously producing a sulfated lead oxide includes a continuously operating mixer into which a pulverized filler (lead-lead oxide powder) is fed by a pneumatic duct or screw conveyor. Sulfuric acid is sprayed into the dry mixture to form the sulfated reaction product. Water is later added to form the battery paste. See, e.g., Jache U.S. Pat. No. 3,449,166, issued Jun. 10, 1969.

Biagetti U.S. Pat. No. 3,765,943 emphasizes the advantages of preparing a tetrabasic lead sulfate from orthorhombic lead oxide. The lead oxide starting material and an expander are mixed with aqueous sulfuric acid so that the reaction is carried out in aqueous suspension. See also Biagetti et al., *Bell System Technical Journal*, September, 1970, No. 49, pp. 1305–1319, wherein the pastes are pre-diluted with water just prior to application to cell grids. Positive plates prepared according to such a procedure generally exhibit good performance and cycle life. However, positive plates prepared from such presulfated paste mixes are difficult to form; see, for example, Yarnell and Weeks, *J. Electrochem. Soc.*, No. 126, p. 7 (1979). Such plates must usually be cured for at least 24 hours before being formed.

Prior art batch processes suffer from various disadvantages. The mixing vessel must be kept clean to avoid jamming due to dried paste left over from a previous batch. Cleaning is also needed in order to switch from a negative plate batch to a positive plate batch because the negative plate additives reduce the performance of positive plates. Batch methods also generally require a dry mixing step prior to the sulfate-forming reaction step. The present invention addresses these disadvantages.

One aspect of the present invention utilizes a dewatering apparatus in a process for making battery paste. Many such devices, such as belt presses, are known and have been used to dewater compositions such as sludges. Davis et al. U.S. Pat. No. 4,697,511, issued Oct. 6, 1987, Emson et al. U.S. Pat. No. 3,974,026, issued Aug. 10, 1976, Davis U.S. Pat. No. 4,475,453, issued Oct. 9, 1984, Dahl U.S. Pat. No. 4,705,602, issued Nov. 10, 1987, Wohlfarter U.S. Pat. No. 3,942,433, issued Mar. 9, 1976, Bastgen U.S. Pat. No. 4,019,431, issued Apr. 26, 1977, and Hakansson et al. U.S. Pat. No. 4,501,669, issued Feb. 26, 1985 exemplify such devices. The present invention advantageously employs a dewatering device in an apparatus for making battery paste.

SUMMARY OF THE INVENTION

A process for making a battery paste according to the invention includes the steps of forming lead compounds in an aqueous slurry, and reducing the water content of the slurry to form a battery paste. According to one aspect of the invention, a slurry containing one or more basic lead sulfates suitable for use as the active material in lead-acid battery electrodes is continuously formed in a reactor. The slurry is withdrawn from the reactor and fed to a belt press which reduces the moisture content of the slurry to the desired level. The invention further provides an apparatus for carrying out such a process, including a reactor and a device associated with the reactor for reducing the moisture content of the slurry. The invention additionally provides a slurry composition which can be made by the described process, which slurry is useful in the manufacture of battery paste.

BRIEF DESCRIPTION OF THE DRAWING

The invention will be further described with reference to the accompanying drawing, wherein like numerals denote like elements, and.

DETAILED DESCRIPTION

Figure 1:
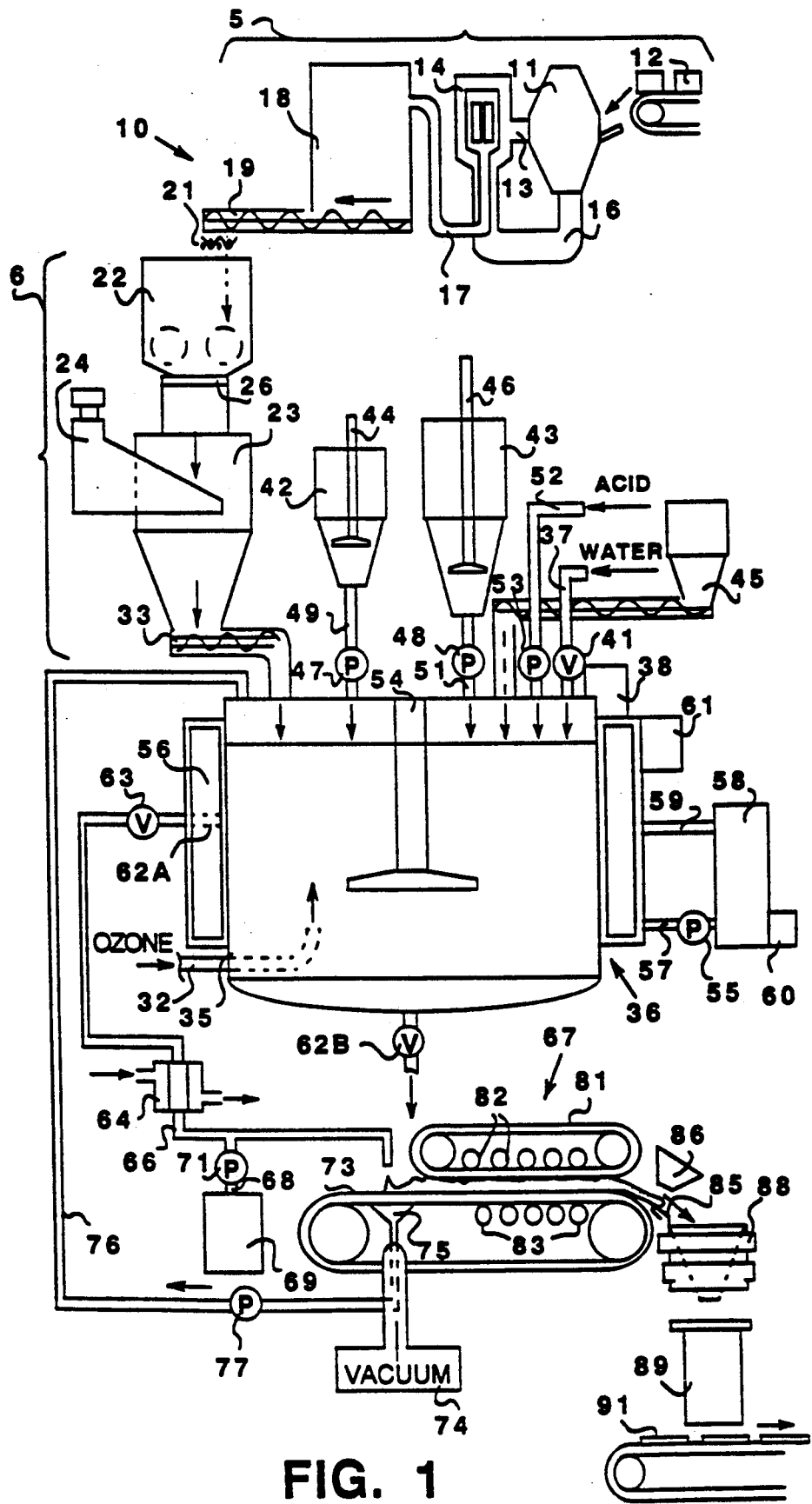
FIG. 1 is a schematic diagram of an apparatus according to the invention.
Figure 2:
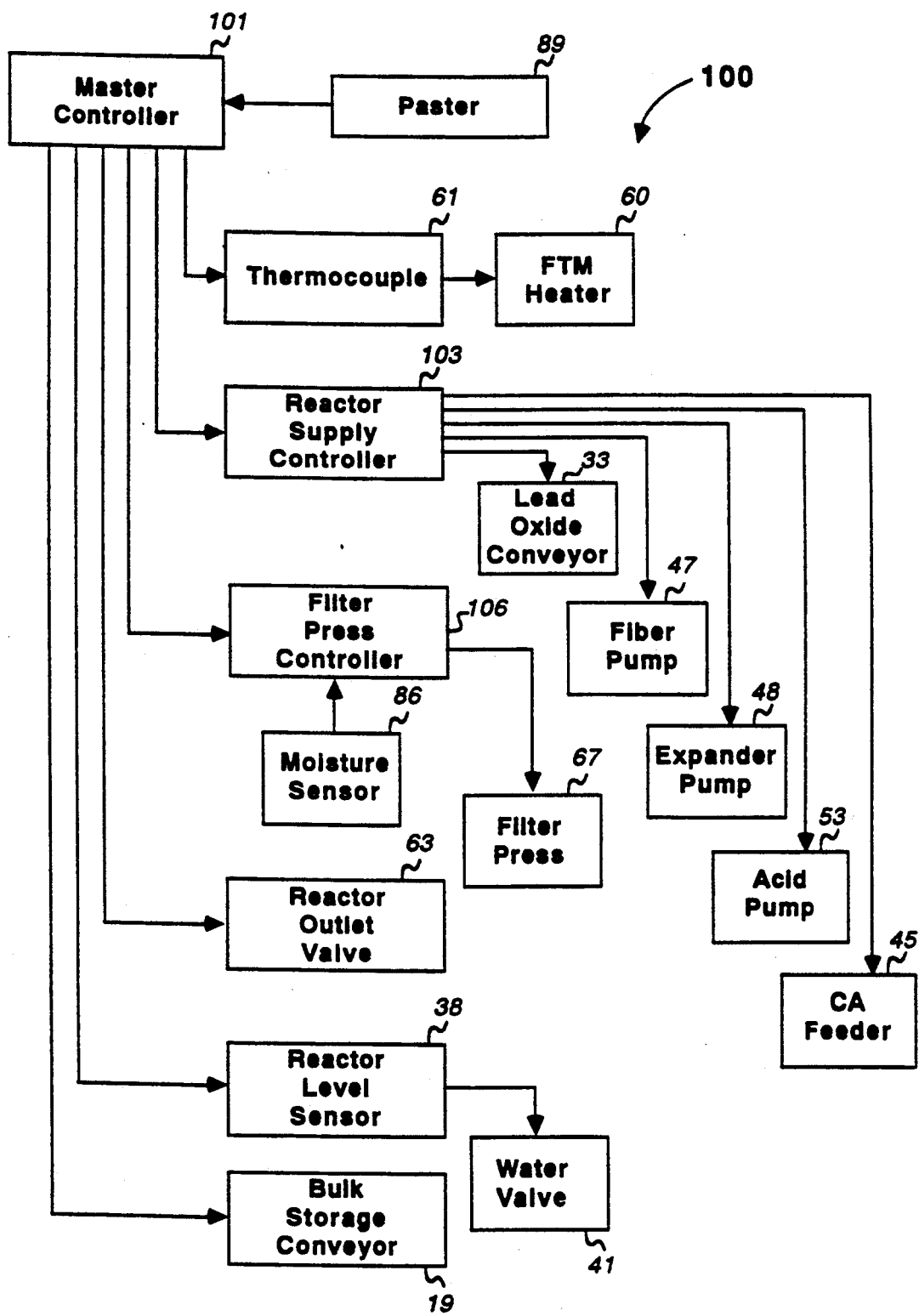
FIG. 2 is a schematic diagram of a control system for the apparatus shown in FIG. 1.

The present invention provides a process and apparatus for making a battery paste wherein the active material can be continuously mixed in aqueous slurry form. Referring to FIGS. 1 and 2, a process line (system) 10 according to the invention for making battery paste includes as major components a system 5 for making powdered lead oxide (leady litharge) from lead ingots, a lead oxide reactor feeder 6, a reactor 36, a dewatering apparatus 67, and an optional control system 100. The nature and function of each of these components is described in detail hereafter.

Referring to FIG. 1, system 5 includes a conventional ball mill 11 which pulverizes leaf ingots 12 in the presence of air to form lead oxides. In the alternative, a Barton pot may be used to make lead oxide particles by atomiziation of liquid lead. Ball mill 11 continuously feeds the lead oxide powder through a line 13 to a classifier 14. Particles outside the desired particle size range are fed through a return line 16 back to mill 11. Particles suitable for use in making lead-acid battery paste generally have sizes of 150 microns or less, preferably 70 microns or less, most preferably 1–50 microns.

Particles from classifier 14 are fed through a line 17 to a bulk storage tank 18. Tank 18 has a large enough capacity to accumulate lead oxide powder therein when the apparatus downstream from tank 18 is idle, i.e., requires no additional oxide. Oxide powder is fed from the bottom of tank 18 by any suitable means, such as a screw conveyor 19, into a weigh hopper 22. Conveyor 19 forces the powder through a screen 21 to break up lumps which form during storage in tank 18.

Weigh hopper 22 includes a metering valve 26 which meters the oxide powder into an oxide feeding tank 23. The level in tank 23 is maintained by a loss-in-weight feeder 24 which weighs the amount of powder in tank 23 and actuates metering valve 26 when the measured weight decreases below a predetermined level. When valve 26 opens, substantially the entire contents of hopper 22 fall into the tank 23, ensuring that the amount of lead oxide in tank 23 is within a desired predetermined range. Hopper 22, tank 23 and loss-in-weight feeder 24 thus cooperate to provide a uniform supply of lead oxide powder to reactor 36.

The oxide powder from feed tank 23 is fed by a screw conveyor 33 to a reactor 36 in which the active basic lead sulfate is formed. The oxide is preferrably fed continuously at a rate in the range of typically about 900 to 4,500 kg per hour. Water is fed into reactor 36 through a water line 37 in an amount sufficient to maintain a slurry at all times, i.e., an amount largely in excess of the amount needed to form the final paste product. A level sensor 38 located near the top of reactor 36, such as a mercury float switch or an ultrasonic level detector, actuates a valve 41 in water line 37. Valve 41 is opened to admit water into reactor 36 in response to a decrease in slurry level in, reactor 36 as detected by sensor 38, then closed when the predetermined level is reached.

Several other inlet lines feed additional materials into reactor 36 as needed to form the desired paste product. Slurries of expander and fiber additives are prepared in respective tanks 42, 43. Tanks 42, 43 are provided with respective stirrers 44, 46 which operate as needed, e.g., continuously, to provide a uniform slurry in each tank. Fibers are used in both positive and negative paste mixes as a binder to improve the handling characteristics of the battery plates after pasting. Suitable fibers include fiberglass, tin or tin dioxide-coated fiberglass, carbon fibers, synthetic plastic fibers such as modacrylic fibers, and mixtures thereof. Such fibers preferrably have a fineness of about 3 denier and lengths in the range of $\frac{1}{8}$ to 1/16 inch. Specific gravity of preferred modacrylic fibers according to the invention is in the range of about 1.2 to 1.5 gm/cc. Fiber and expander may also be added directly to reactor 36 in dry form.

The expander is added to negative paste mixes to extend the battery cycle life of negative plates. The expander functions by minimizing detrimental shrinkage and surface area losses which normally occur in negative plate materials during repeated battery charge and discharge cycles. Suitable expanders include carbon black (also a colorant), lignins, or their synthetic equivalents, barium sulfate, and mixtures thereof.

Water and expander or fiber are added to tanks 42, 43 manually (or automatically) as needed. The ratio of solid to water should be less than 60 grams per liter for the fibers, preferably about 24 to 36 grams per liter to maintain an even, relatively thick slurry. The solid to water ratio for the expander may range from about 0.12 to 1.2 kilograms per liter, preferably about 0.24 to 0.48 kilograms per liter.

In the embodiment of FIG. 1, reactor 36 is a continuously stirred tank reactor (CSTR) including a reactor vessel (tank) 35 which has a discharge outlet 62A at the side thereof. A plug flow reactor could also be utilized. Outlet 62A is preferably located on the side of reactor 36, about halfway down, because free lead particles in the slurry tend to sink to the bottom of the reactor and would clog an outlet located at the bottom of the reactor. If the lead oxide fed into reactor 36 is essentially lead free, or if the slurry does not contain substantial amounts of tetrabasic lead sulfate, then outlet 62A may be located at the bottom of reactor 36. Otherwise, a drain valve 62B is provided at the bottom of reactor 36 for periodically drawing off the heavy, lead-rich slurry that accumulates at the bottom of reactor 36. The lead-rich slurry drawn from valve 62B may be returned to a smelter for reclamation or reprocessed through an oxide mill.

The slurry process of the invention can remove free lead from the slurry. This lead removal process provides a means for eliminating a lengthy curing step which is otherwise needed to lower free lead levels by air oxidation. The alternative of using a lead-free lead oxide starting material is generally expensive. The present invention eliminates the need for such measures.

If desired, pressurized ozone gas from an ozone supply line 32 may be fed into reactor 36 near the bottom thereof so that ozone gas bubbles upwardly through the slurry. The ozone reacts with the oxide to convert PbO to $PbO_2$. This $PbO_2$ acts as a conductive additive which enhances the formation efficiency of a positive plate. Gaseous ozone may be produced by any suitable means. For example, a gaseous mixture for use in the invention containing about 6 percent ozone can be readily formed by subjecting oxygen gas to corona discharge. The resulting gas is preferably humidified to 100% room humidity for best results. Ozone gas can also be formed electrochemically.

As an alternative, a conductive additive may be added directly to the slurry. Useful conductive additives include $PbO_2$, $Pb_3O_4$, carbon, metal oxides including tin dioxide and titanium oxide, and combinations thereof. Such a conductive additive is generally added in amounts ranging from about 0.1 to 50 percent by weight based on the solids present in the paste. The conductive additive may be added manually or by a dry feeder 45 similar, for example, to loss-in-weight feeder 6.

Reactor 36 may be operated at any temperature in the range of 0° C. to 100° C. or higher, if reactor 36 is pressurized. Temperatures in the range of about 20° C. to 95° C. are preferred for the synthesis of tri-and tetrabasic lead sulfates. The solids concentration of the slurry generally may range from about 10 wt. % to about 80 wt. %. Outside of this range the slurry is either excessively thin or thick. The total solids added to reactor 36 to form the slurry generally comprise at least about 98 wt. % lead oxide and less than about 2 wt. % fiber and expander, if used. The lead oxide component can contain about 0 to 35 wt. % free lead as well as lead oxides such as PbO, $PbO_2$ and $Pb_3O_4$. The following table sets forth preferred reactant compositions for positive and negative paste mixes:

TABLE 1

| | Solids for Positive Paste | |
|---|---|---|
| Ingredient | Preferred Range | Most Pref. Range |
| Fiber | 0 to 0.4 wt. % | 0.05 to 0.25 wt. % |
| Cond. Additive | 0 to 50 wt. % | 0.1 to 25 wt. % |
| Lead oxide* | balance | balance |

TABLE 2

| | Solids for Negative Paste | |
|---|---|---|
| Ingredient | Preferred Range | Most Pref. Range |
| Fiber | 0 to 0.4 wt. % | 0.10 to 0.12 wt. % |
| Expander | 0 to 3 wt. % | 0.50 to 2.10 wt. % |
| Carbon | 0 to 0.5 wt. % | 0 to 0.2 wt. % |
| Lead oxide* | balance | balance |

*Includes free lead also.

These solids, in combination with the acid and water present in the amounts described above, provide a slurry according to the invention useful in the synthesis of lead-acid battery pastes.

A pair of metering pumps 47, 48 control the flow of expander and fiber through respective lines 49, 51. Pumps 47, 48 and other similar pumps used in system 10, may, for example, be positive displacement pumps, particularly progressing cavity pumps. Each such pump can convert an electrical signal received from a control device to a rotating speed which corresponds to the flow rate therethrough, or to the stroke frequency, if a reciprocating pump is used. Lines 49, 51 are connected to tanks 42, 43 near the bottom of each tank. Pumps 47, 48 generally operate simultaneously with conveyor 33 and feeder 45 (if present) at a predetermined rate which is calculated from the specific paste recipe. Similarly, sulfuric acid is fed directly into reactor 36 at a predetermined rate through an acid feed line 52.

A metering pump 53 controls the rate at which the acid is introduced into reactor 36. Pump 53 also operates in conjunction with screw conveyor 33 so that the oxide, fiber, expander, conductive additive and acid are added together, preferably to the upper surface of the slurry in reactor 36. No step of premixing the oxide with the fiber and expander is needed. Recycled scrap paste material from a paster 89 may also be added directly into reactor 36.

Reactor 36 has a stirrer 54 which runs continuously to keep the solids in suspension and prevent the slurry from solidifying on the inside of vessel 35. A temperature control jacket 56 surrounds the outside of reactor 36. A heat transfer fluid such as water is continuously circulated by a pump 55 from a reservoir 58, through a heat transfer fluid supply line 57, jacket 56, and a return line 59 back to reservoir 58. Reservoir (water heater tank) 58 is heated intermittently by a heater 60. A thermocouple 61 is provided to determine the temperature of the slurry and intermittently actuate heater 60 to maintain the desired reactor slurry temperature. If a low reaction temperature is desired, heater 60 may be replaced by a suitable cooling unit. As an alternative to a jacket-type temperature control system, heating elements may be embedded in the wall of reactor 36 if no cooling will be needed.

The slurry is intermittently or continuously withdrawn from outlet 62A. A valve 63 regulates flow from outlet 62A. Preferably, the slurry is withdrawn at the same rate at which the solid ingredients are added, so that the composition within the reactor remains constant and the reaction(s):

$H_2SO_4 + 5PbO \rightarrow 4PbO.PbSO_4 + H_2O$
$H_2SO_4 + 4PbO \rightarrow 3PbO.PbSO_4.H_2O$
$H_2SO_4 + 2PbO \rightarrow PbO.PbSO_4 + H_2O$
$H_2SO_4 + PbO \rightarrow PbSO_4 + H_2O$ do not result in complete conversion of all of the lead oxide (PbO) to lead sulfates, as in prior processes. As a result, the slurry withdrawn from reactor 36 may contain substantial amounts of both lead oxide and lead sulfates. It is normally preferable to have both of these components in the resulting battery paste. The illustrated embodiment of the invention can thus eliminate the need to convert all of the lead oxide to basic lead sulfate, and the subsequent step of adding lead oxide back in to make the paste.

The slurry then flows through an optional heat exchanger 64, for example, a shell-and-tube type heat exchanger. Heat exchanger 64 is connected to a heat transfer medium circulation system (not shown) such as, for example, one similar to that described above including tank 58, pump 55, and lines 57, 59. Heat exchanger 64 decreases the temperature of the slurry to the desired paste temperature, generally to about 43° C. to 49° C., the temperature at which a paster usually operates. However, pasting temperatures outside of this operating range may be appropriate for some slurry prepared pastes. The slurry next flows through a pipeline 66 towards a moisture reduction device. In the described embodiment, the moisture reduction device is a vacuum-assisted filter press 67, such as an expressor press manufactured by Eimco Process Equipment Company.

Prior to reaching filter press 67, the slurry may be commingled in pipeline 66 with a persulfate additive fed into pipeline 66 through a branch line 68 from a persulfate reservoir 69. The persulfate reacts with lead oxide in the paste to form lead dioxide as follows:

$$2PbO + Na_2S_2O_8 \rightarrow PbO_2 + PbSO_4 + Na_2SO_4$$

An analogous reaction can be written for the potassium persulfate salt. Persulfate addition is a practical alternative to direct lead dioxide addition. A metering pump 71 disposed in branch line 68 regulates the amount of persulfate added. The persulfate may be in powder form or may be an aqueous solution of a salt of peroxydisulfuric acid, $H_2S_2O_8$. If necessary, a suitable mixer (not shown) may be provided in line 66 to mix the persulfate additive with the slurry from the reactor. Powdered persulfate may alternatively be added directly to reactor 36 from dry feeder 45. The amount of sodium or potassium persulfate is preferably about 1 to 10 percent by weight of the solids in the slurry.

Positive plates containing tetrabasic lead sulfate exhibit very good discharge capacity and cycle life when they are properly formed. However, these plates are normally very difficult to form. These formation problems are especially difficult when the tetrabasic lead sulfate containing plates are made using low free lead oxide. Incorporation of persulfate or one of the other equivalent conductivity enhancers described above into the slurry preparation of such plates yields efficient high rate formations resulting in high performance positive plates.

It has been determined that free lead levels greater than about 5 wt. % can strongly inhibit the persulfate reaction. Therefore, use of a persulfate additive is generally restricted to low free lead content oxides. If leady oxides containing higher free lead contents are used, then the previously described ozone treatment or direct addition of a conductivity enhancing agent can be used instead.

Persulfate treatment may be used either alone or in conjunction with the ozone treatment or direct addition of a conductivity enhancing agent. All such treatments are better suited for making positive plates as compared to negative plates. The strong reducing environment of the negative plate adversely affects plate formation when $PbO_2$ is formed therein by the foregoing persulfate or ozone reactions. Normally a lengthy curing step can be omitted for negative plates whether or not they contain large amounts of free lead. Thus, negative plates according to the invention do not generally contain lead dioxide.

Negative plate formation poses problems if the lead oxide used to make the paste has a very low free lead content, for example, less than about 0.2 wt. % of the lead oxide. This problem can be remedied by incorporating therein an amount of high surface area carbon effective to enhance the formation process without adversely affecting battery performance. For this purpose, from about 0.05 to 0.5 wt. %, especially 0.1 to 0.2 wt. % of carbon based on the total solids present may be incorporated into the negative paste mixture. This can be done, for example, by commingling the slurry in pipe 66 with the carbon additive by means similar to those described for the persulfate additive, or by adding carbon directly to reactor 36 via feeder 45.

A preferred negative paste mixture contains, as solids, 55-60 wt. % (tri)basic lead sulfate, 40-44 wt. % o-PbO, 0.5-0.8 wt. % expander, 0.1-0.2 wt. % of Ketjen black carbon powder having a surface area greater than about 1200 $m^2$/gm BET, and 0.05-0.2 wt. % plastic fibers. The carbon preferably has a high surface area as described in the foregoing example. The final water content of such a paste is in the range of about 0.1-0.2 ml/gm of solids. The added carbon is in addition to any carbon already present in the expander or fibers.

The slurry is discharged from pipe 66 and uniformly distributed onto the upper surface of a moving conveyor belt 73. Belt 73 is made of a microporous fabric. A vacuum pump 74 applies suction to the slurry on belt 73 and draws water therefrom. Suction of at least about 380 mmHg is generally needed for this purpose. Excess water is drawn through belt 73 into a suitable collection funnel 75 which is in turn connected to a recirculation line 76. A pump 77 operates continuously to return water from collector 75 to reactor 36.

The dewatered slurry then passes beneath a second (upper) conveyor belt 81. Belts 73, 81 press-filter water from the slurry. At least one and preferably both of belts 73, 81 are made of a microporous fabric, such as nylon, polypropylene or polyester, preferably having an average pore size of about 10 microns or less, preferably 1 micron or less. These characteristics render belts 73, 81 durable, water pervious and substantially impermeable to fine, solid particles in the slurry. A series of pairs of upper and lower, spaced-apart parallel pinch rollers 82, 83 are disposed above and below belts 81, 73, respectively. Each pair of rollers 82, 83 exerts at least about 50 pounds per linear inch (88 N/cm) on the paste passing therebetween.

Excess moisture in the paste is squeezed out by rollers 82, 83 and drawn through belt 73 into the associated collector 75. The filtration pressure is adjusted to achieve the desired level of moisture for the paste, generally 5 to 30 wt. %, most preferably about 12 to 15 wt. % for optimum grid pasting characteristics. The resulting filtration cake has a thickness of several millimeters and is suitable for use as a lead-acid battery paste.

The paste emerges from beneath upper belt 81 and travels on lower belt 73 beneath an infared moisture sensor 86. Sensor 86 measures the moisture of the paste and sends a signal of corresponding magnitude to a filter press controller 106 (see FIG. 2). Controller 106 adjusts the pressure(s) exerted by rollers 82, 83 to maintain the desired moisture level in the paste. The pressure is increased if the moisture level becomes too high, and decreased if it becomes too low.

The paste is then fed directly from one end of filter press 67 by any suitable means, for example, over a blade 85, into a conventional paster cone feeder 88. In the alternative, since the invention can supply paste on demand to paster 89, cone feeder 88 may be eliminated. Cone feeder 88 feeds the paste to paster 89, which applies the paste to lead grids 91 to make battery plates. Alternatively, if desired, the paste may first pass through a mill in order to break up the filtration cake for pasting, before being fed to cone feeder 88. An advantage of the invention is that the moisture content of the paste emerging from filter press 67 can be precisely controlled, so that no subsequent drying step is needed.

The foregoing apparatus according to the invention can be used to provide a continuous supply of battery paste for the manufacture of positive or negative battery plates. The operative components of the system, including the pumps, conveyors, feeders and stirrers, may be operated manually. However, in a preferred embodiment of the invention, conventional progammable logic controllers (PLC's) or similar devices are used to control the operative components of the system.

Referring to FIG. 2, a master controller 101 accepts inputs for the desired reactor temperature (water heater set point), the feed rate for conveyor 33, the feed rates for the other ingredients as indicated by the paste recipe, i.e., for the fiber, expander, conductive additive (CA) and acid, the desired moisture level in the paste, and the desired slurry level in reactor 36. Controller 101 sends the set point temperature to thermocouple 61. Thermocouple 61 then actuates heater 60 as needed to heat the heat transfer fluid in jacket 56, which in turn heats the slurry in reactor 36 to the desired temperature.

Master controller 101 is connected to a slave reactor supply controller 103 which operates conveyor 33, pumps 47, 48 and 53, and feeder 45, which feed expander, fiber, acid, and conductivity enhancer, respectively, to reactor 36. Controller 103 receives the slurry recipe from master controller 101 as flow rates for conveyor 33, pumps 47, 48 and 53, and feeder 45. Master controller 101 is also connected to filter press controller 106 to both control operation of filter press 67 and provide filter press controller 106 with the selected paste moisture level. Master controller 101 is further connected to reactor discharge valve (or pump) 63 and reactor level sensor 38. Valve 63 opens and closes in response to a signal from master controller 101. Master controller 101 sends level sensor 38 the selected slurry level setting for reactor 36.

Controller 101 receives an input signal (call for paste) from paster 89 which indicates that paster 89 is in operation. In the alternative, controller 101 can be connected to paster cone feeder 88. Feeder 88 can be provided with a level sensor which sends a call for paste to master controller 101 in response to depletion of the supply of paste in cone feeder 88.

Upon receiving a call for paste from paster 89 or feeder 88, master controller 101 opens valve 63 and sends a signal to filter press controller 106, causing it to operate filter press 67, i.e., turn on conveyors 73, 81, pressure rollers 82, 83 and vacuum 74. The output flow through valve 63 (in slurry volume per unit time) and the slurry density (weight of solids per unit volume) are known constants. Using these constants, the desired rate of addition of solids (oxide, fiber, expander) to reactor 36 is determined.

Simultaneously with the signal opening valve 63, master controller 101 sends a signal to reactor supply controller 103 which causes it to actuate conveyor 33 and pumps 47, 48 and 53 at their respective predetermined rates. The rate of acid addition is calculated based on the stoichiometry of the reaction occurring in the reactor. Master controller 101 equalizes the amounts of solids entering and leaving reactor 36. This maintains a steady state of reaction in reactor 36. The overall solid-to-water ratio in reactor 36 is maintained in the range of about 0.2 to 1.2 kilograms solids per liter of water.

Water addition to the reactor is controlled automatically by the abovedescribed feedback loop utilizing level sensor 38, water valve 41, and if desired the described system 75, 76, 77 for recirculating water withdrawn by vacuum 74. Similarly, the respective feedback systems for maintaining the reactor temperature and the moisture level of the paste operate independently of master controller 101 once the desired set values have been provided.

Automated control of components upstream from weigh hopper 22 is also possible. Additional lead ingots 12 are added as needed to mill 11. Conveyor 19 may run continuously so long as system 10 is active, e.g., may be actuated by controller 101 together with valve 63 and controller 103. Optionally, conveyor 19 and hopper 22 may be provided with suitable means, e.g. a level sensor and controller, for automatically actuating conveyor 19 in response to a low level of lead oxide in weigh hopper 22.

When system 10 is idle, master controller 101 closes valve 63, causes filter press controller 106 to deactivate filter press 67, and causes reactor supply controller 103 to deactivate conveyor 33, pumps 47, 48 and 53, and feeder 45. Stirrers 44, 46, 54 continue to operate, and water is added intermittently to reactor 26 as needed to maintain the desired reactor slurry level. Ball mill 11 can continue to operate so that lead oxide accumulates in bulk storage tank 18 until needed.

Figure 3:
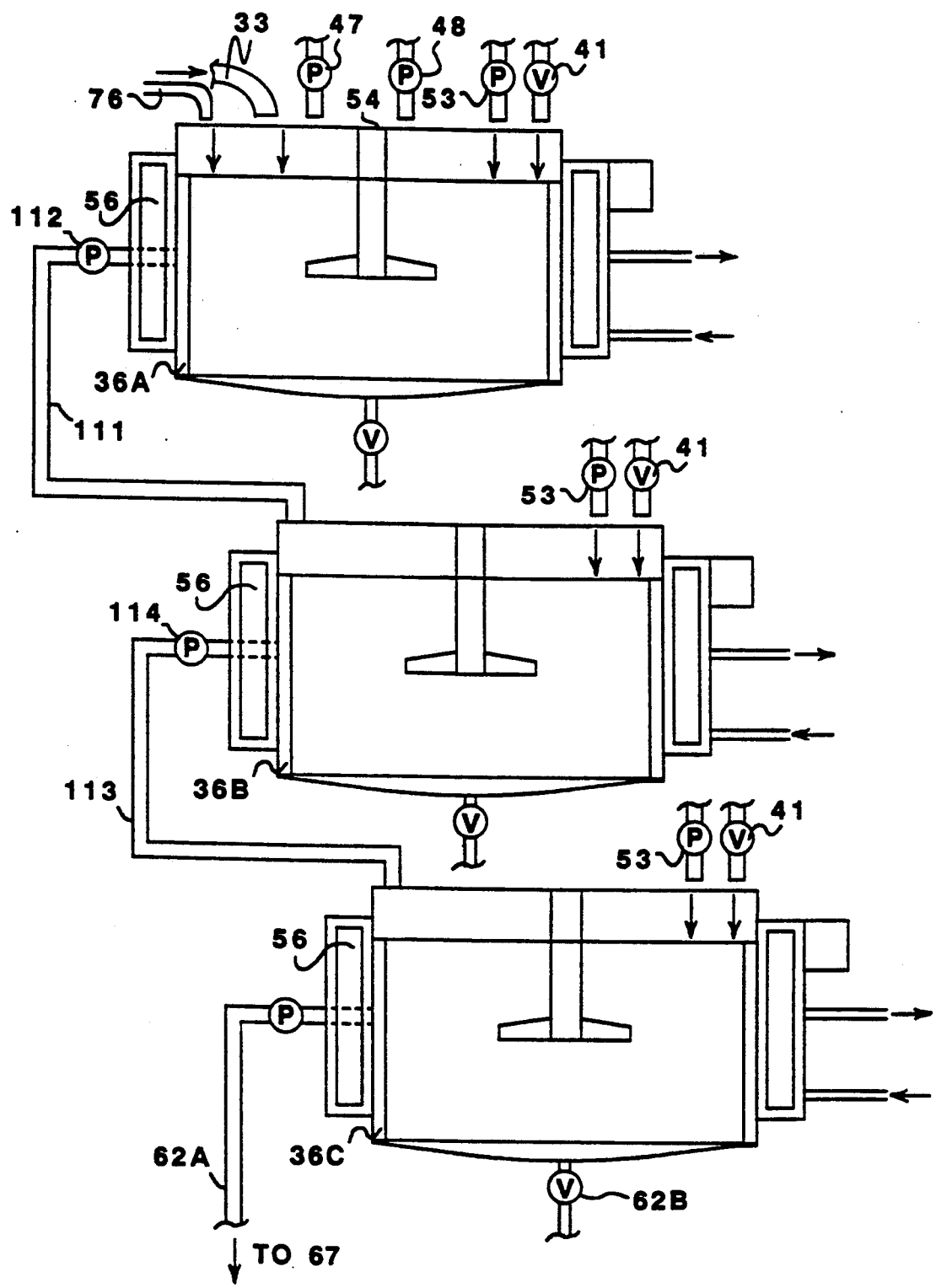
FIG. 3 is a partial schematic diagram of an alternative embodiment of an apparatus according to the invention employing multiple reactors.

Referring to FIG. 3, an alternative embodiment of the invention utilizes a series of reactors 36A, 36B and 36C for making pastes containing tetrabasic lead sulfate or tri/tetra mixtures. A pipeline 111 provided with a metering pump 112 feeds partially reacted slurry from reactor 36A to reactor 36B. A second pipeline 113 provided with a second metering pump 114 similarly feeds partially reacted slurry from reactor 36B to reactor 36C, wherein the reaction proceeds to the desired degree of lead oxide conversion. Such a cascaded reactor system can provide a greater through speed for the slurry, and can reduce the size and cost of the apparatus, e.g., three 2,000 liter reactors 36A, 36B, 36C could replace a single 20,000 liter reactor 36.

Lead oxide, acid, water, and any desired additives will generally be added to the first reactor 36A in essentially the same manner as in the embodiment of FIG. 1. Reactors 36B and 36C may have suitable means for providing additional acid, water, or other ingredients. Reactors 36A-36C may have the same volume and can be operated at the same temperature. In the alternative, each of reactors 36A, 36B and 36C can be designed and maintained at a different temperature in order to optimize the reaction, for example, to obtain a higher overall rate of reaction. The equation $R = K_1 + K_2 C_{3b} C_{4b}$, the rate equation for formation of tetrabasic lead sulfate, wherein R is reaction rate, $K_1$ and $K_2$ are constants that vary with temperature, $C_{3b}$ is tribasic concentration and $C_{4b}$ is tetrabasic concentration, may be used to determine the most desirable reaction conditions in a multireactor system of this type.

Figure 4A:
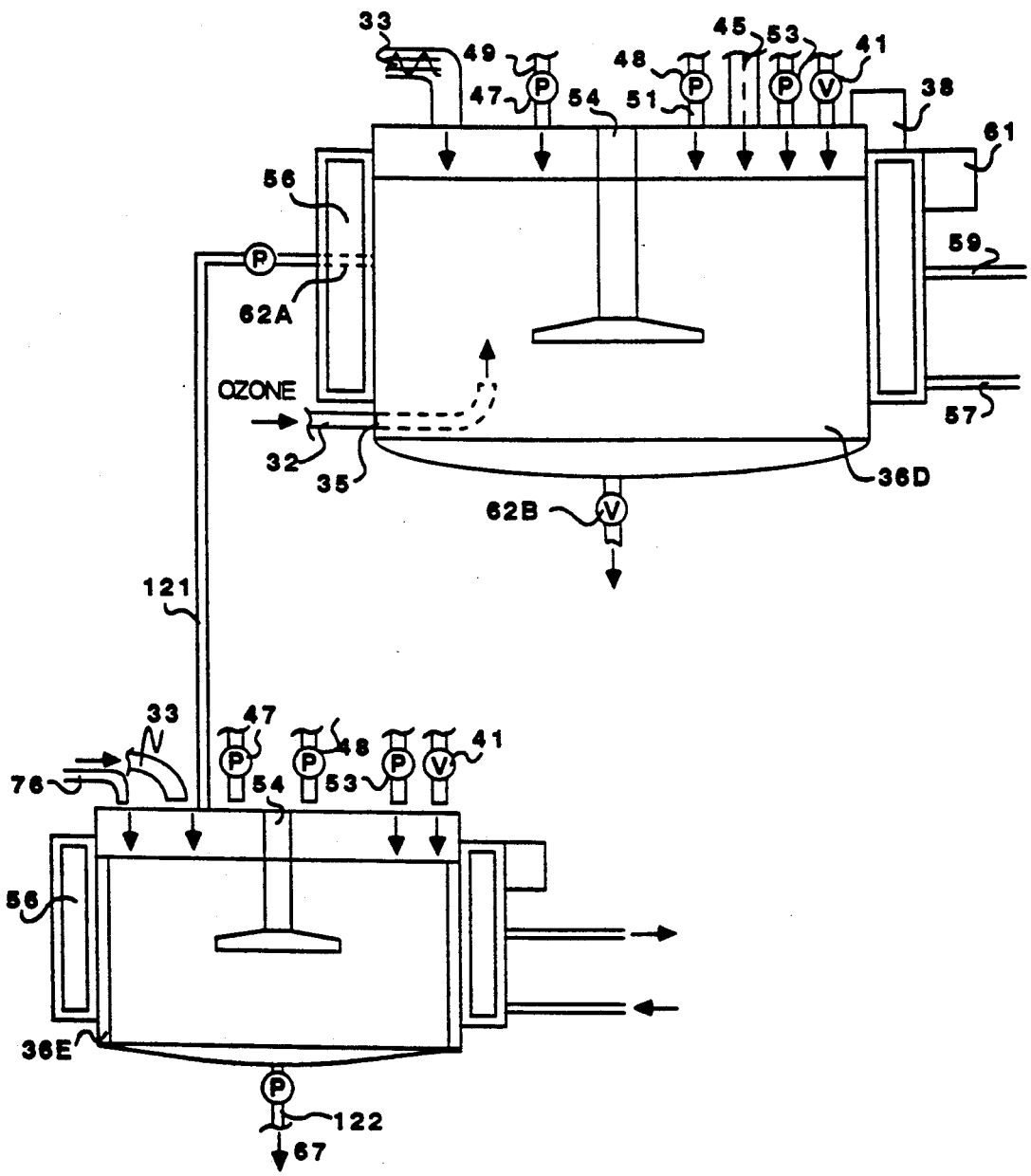
FIGS. 4A and 4B are partial schematic diagrams of further alternative embodiments of an apparatus according to the invention employing multiple reactors.

FIG. 4A illustrates an apparatus for making pastes containing mixtures of tri- and tetrabasic lead sulfates. Conditions in a first reactor 36D are adjusted so that the lead sulfate output through a pipeline 121 is substantially all tetrabasic lead sulfate. Pipeline 121 feeds the slurry containing tetrabasic lead sulfate directly into a second reactor 36E. Conditions in reactor 36E are adjusted so that only tribasic lead sulfate forms in reactor 36E. Reactor 36D may, for example, be maintained at an elevated temperature for forming tetrabasic lead sulfate in the range of 65°-100° C., while reactor 36E is maintained at a lower temperature of 20°-60° C. for forming tribasic lead sulfate. The feed rate through pipeline 121 determines the overall composition of the tri/tetra mixture in reactor 36E. The slurry from reactor 36E is withdrawn through an outlet 122 for dewatering as described above. Reactor 36D is typically larger than reactor 36E, e.g., at least double, especially 2-4 times greater volume if the resulting sulfate mixture comprises about 40-60% tetrabasic lead sulfate.

The embodiment of FIG. 4A has an advantage over the embodiment of FIG. 1 when a tri/tetra mixture of a specific concentration is needed. Although a single reactor 36 can operate to continuously produce such a mixture, problems arise when delays require that the reactor operate intermittently rather than continuously. When reactor 36 is idle, tribasic lead sulfate will continue to convert to tetrabasic lead sulfate at the elevated temperature of the slurry. This will change the ratio of tri- to tetrabasic lead sulfate, so that the desired mixture will not be obtained when reactor 36 resumes operation. Reactors 36D, 36E prevent this problem. Reactor 36E operates at a lower temperature than 36D, so that no conversion of tri- to tetrabasic lead sulfate occurs when the system becomes idle. When reactors 36D, 36E resume operation, the resulting paste will have the same tri/tetra ratio.

Figure 4B:
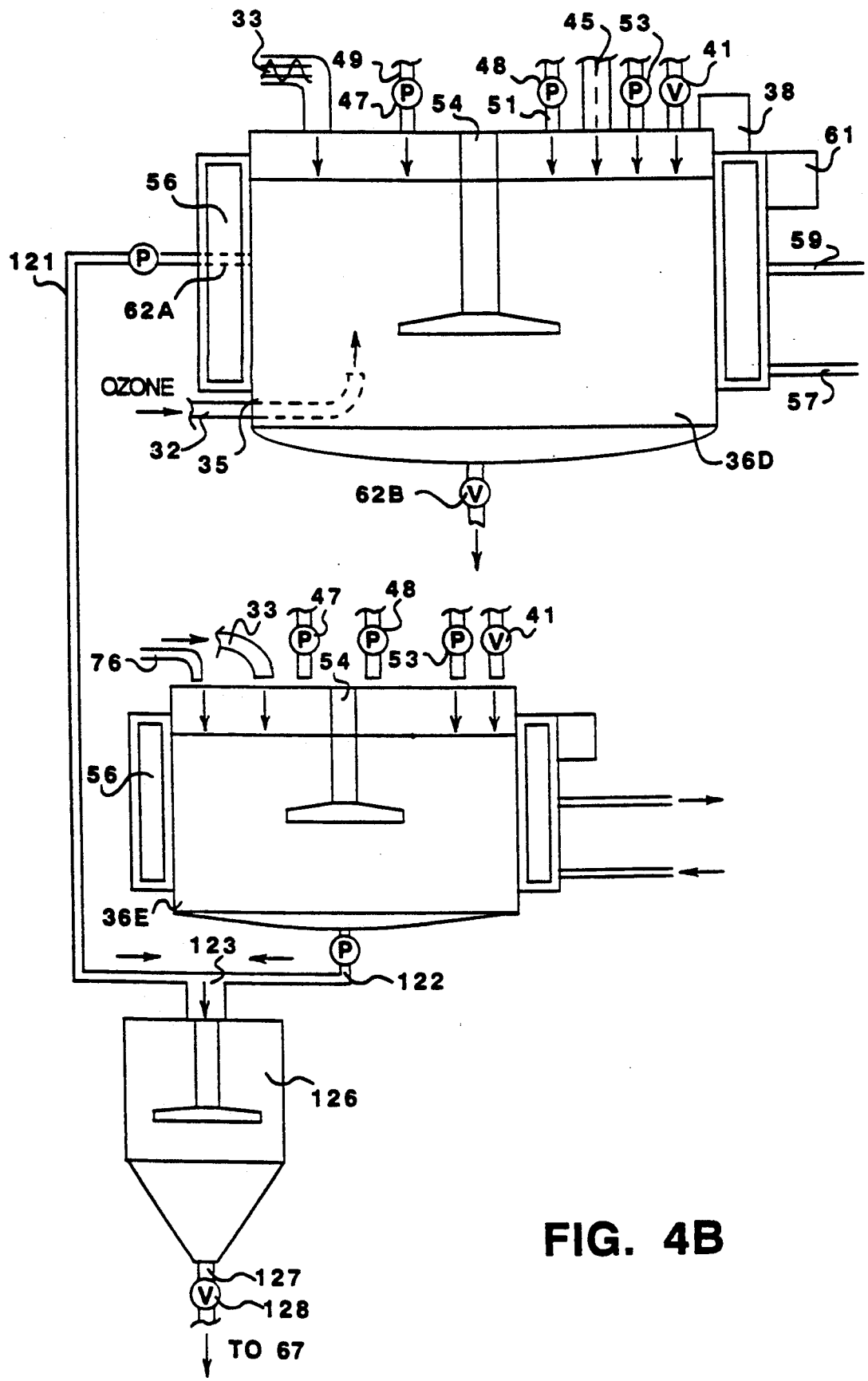

FIG. 4B illustrates reactors 36D, 36E arranged in parallel rather than in series. In such an embodiment lines 121, 122 meet at a T-joint 123 wherein the slurry mixtures commingle. The combined slurries are then fed into a mixer 126 to form a homogenous mixture, and then discharged through an outlet line 127 provided with a valve 128 to filter press 67. Such an arrangement could be used, for example, to make a mixture of lead sulfate ($PbSO_4$) and tetrabasic lead sulfate without any tribasic lead sulfate. Such non-equilibrium mixtures have benefical effects on the bonding of adjacent paste crystals during curing. Such bonding can increase plate stength and cycle life.

Figure 5:
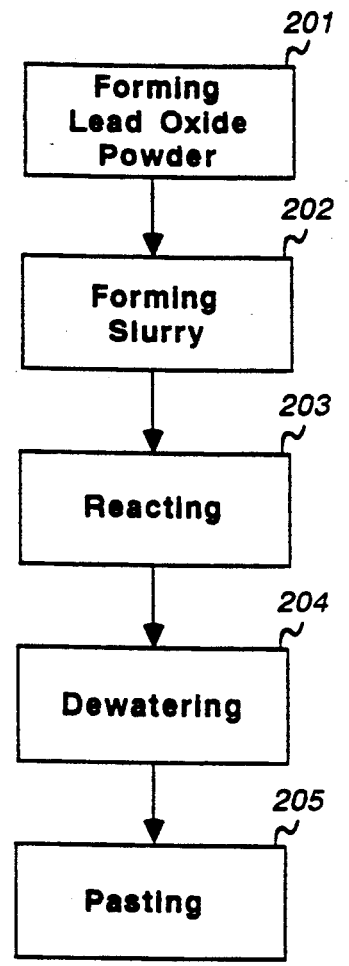
FIG. 5 is a flow diagram of a process for making a battery paste according to the invention.

FIG. 5 illustrates a method of the invention. As described above in connection with FIG. 1, such a method initially involves a step 201 of forming a lead oxide powder, such as by milling in air. Preformed lead oxide powder may be used in lieu of carrying out step 201. A second step 202 then involves forming an aqueous slurry containing the lead oxide, acid and water, and any additives, such as fiber, expander and any conductive additives. A step 203 of allowing the basic lead oxide reaction to proceed then follows. Generally, this step further involves continuously stirring the slurry at a rate effective to keep the solids in suspension and prevent solid deposits from forming on the reactor walls and base while maintaining the reaction temperature at the desired level (generally 20° C.–95° C.). Additional water is added as needed to maintain the desired slurry consistency.

After reaction step 203 is completed, the slurry is withdrawn from the reactor intermittently or continuously at a predetermined rate which generally matches the rate at which the reactants are added to the reactor. The slurry is then partially dewatered (step 204) to form a battery paste of the desired consistency. This step is advantageously carried out by first subjecting the slurry to suction through a suitable filter medium (e.g. belt 73) and then removing further water by press filtration, for example, by means of filter press 67. The paste may then be fed directly to a pasting apparatus for a further step of pasting electrode grids (step 205).

In accordance with conventional procedures, the pasted grids (plates) may then subjected to successive steps of flash drying and curing. Flash drying is needed only if the plates are to be stacked face-to-face for curing. Flash drying involves heating the plate for a short time so that the surface of the plate dries; the interior of the plate remains wet. Flash drying may be carried out by conveying the plates through an oven heated to at least about 500° F. for a heating time of about at least about 8 seconds, particularly 10–15 seconds. Curing generally involves allowing the plates to stand for a period of at least about 24 hours under conditions of elevated temperature and humidity, e.g., 48° C. at 95% humidity. Curing may be omitted for positive plates if low free lead oxide is used, or if an oxidizing agent is used to oxidize the free lead. Curing is beneficial but not absolutely necessary in forming negative plates. If curing is omitted, a method of controlled plate drying is needed.

The battery plates are then assembled into the battery casing, and the battery is filled with acid electrolyte. The completed battery is then subjected to conventional formation. During formation a current is applied to the plate in order to convert lead sulfate, basic lead sulfate and lead oxide to active material ($PbO_2$ for a positive plate and Pb for the negative plate). Ozone treatment or the use of conductive additives allows the formation step to be carried out more efficiently at a high rate for a positive plate, for example, in no more than about 8 hours. The thus-formed plates have good reserve capacities.

A variety of optional steps can also be included. For example, the paste may be reacted with a persulfate prior to dewatering step 204, for the purposes described above. After dewatering, the paste may be dried and/or milled prior to pasting. A step of recycling water withdrawn during dewatering step 204 to the slurry of steps 202, 203 is also useful for conserving water. Other optional steps may include treating pasted positive plates with either gaseous ozone or spray-coating with aqueous solutions of persulfate preceding, during or following the flash-drying step. These and the various other operations described above in connection with the apparatus according to the invention may be used individually or in combination with steps 202-204.

The process of the present invention has many advantages over known processes for the production of battery paste. The addition of the lead oxide, fiber, expander, and conductivity enhancing agent directly into the reactor, with the fiber and expander in the form of slurries, eliminates the need for a dry mixing step and provides better dispersion of the solids in the resulting slurry. In the prior batch process, dead spots within the mixture harden into lumps, jamming the paster or causing the plates to contain irregular chunks. Since the slurry in the reactor according to the invention is continuously stirred and has a constant consistency due to the intermittent addition of water, no solid deposits or lumps form in the slurry or on the reactor walls, eliminating pasting problems and greatly reducing cleaning time. This is particularly useful when switching from a negative to a positive paste recipe, since additives used in the negative paste are detrimental if such additives contaminate the positive paste.

Further, the specific gravity and addition rate of the sulfuric acid in the process according to the invention are not as critical as in the prior batch process described above so long as they are known, and "burning" (i.e., oversulfating) the paste with the acid can be avoided. The large excess of water present in the reactor facilitates temperature control and can virtually eliminate problems with overheating the paste. The water used need not be distilled or preacidified.

The dewatering filtration step of the invention allows the moisture of the paste to be controlled by varying the filtration pressure. This eliminates the need, for example, to add additional water or acid in order to obtain a paste of the required consistency or density. Filtration pressure adjustment is also a more effective way to control these properties.

The process of the invention can utilize a variety of lead oxides including Barton, leady and nonleady oxides of any crystal structure, and can produce a paste containing either tribasic lead sulfate, tetrabasic lead sulfate, or a mixture thereof at a specified ratio. The process of the invention can also produce other mixtures containing, for example, monobasic lead sulfate and normal lead sulfate, and lead hydroxide, $Pb_3O_4$, or $PbO_2$. Production of tetrabasic lead sulfate using the conventional batch process discussed above generally requires reacting lead oxide containing very low amounts of free lead with stoichiometric amounts of acid, followed by complete drying of the mix, then forming the paste by addition of water. Tetrabasic lead sulfates enhance porosity and are preferred for use in making positive plates according to the invention. Tribasic lead sulfates are generally preferred for use in negative plates to obtain batteries with better life and cold cranking capacity.

From a production standpoint, the invention allows greater paste production rates, potentially about 4,000 kilograms per hour or more, as compared to about 1,800 kilograms per hour by conventional batch processes. The system can remain idle for an indefinite period and the slurry composition will remain constant. The embodiments of FIGS. 4A, 4B make this possible even for pastes containing both tri- and tetrabasic lead sulfates. The paste produced has a more consistent composition, and may in addition provide a more desirable crystal structure. The composition of the paste may be readily adjusted, eliminating the need to adjust tetrabasic lead sulfate concentration by curing.

According to a further aspect of the invention, a process of making a lead acid battery is provided wherein curing of the positive and negative plates is omitted. Such a process includes an initial step of forming a paste mixture. As described above, this step comprises reacting a lead oxide having a low free lead content with sulfuric acid in an aqueous slurry, then dewatering the partially reacted slurry to obtain the paste material. If a positive plate is being made the positive paste may be treated with an agent which forms $PbO_2$, such as ozone or persulfate. Alternatively, $PbO_2$ or a comparable conductivity enhancing agent can be directly added to the slurry prior to dewatering. As a further alternative, a conventional leady oxide could be used to make a paste for positive plates, and the plates could then be subjected to an accelerated curing step in an essentially pure oxygen atmosphere to convert the free lead to lead oxide.

The paste is then applied to a metallic grid to form one or more positive battery plates. The pasted positive plates are then flash dried, if needed. Negative plates are then prepared as described above. The plates are assembled in a battery casing in a conventional manner, and the battery is then filled with the acid electrolyte and formed (charged).

Such a process can greatly reduce the amount of time needed to manufacture a lead-acid battery, because a lengthy curing step is not needed. The main purpose of conventional slow curing of positive plates is two-fold. First, if the paste on the plate contains free lead, curing oxidizes it. Second, curing generates the desired tribasic/tetrabasic crystal structure for optimizing the strength and electrical performance of the plate. The amount of tetrabasic lead sulfate is determined during paste formation, and no subsequent adjustment is needed. Free lead can be removed or oxidized. Elimination of the curing step in this manner can allow a complete lead-acid battery to be manufactured in less than 24 hours.

It will be understood that the foregoing description is of preferred embodiments of the invention, and that the invention is not limited to the specific forms described. For example, the apparatus according to the invention may advantageously be employed to produce plates for batteries other than lead-acid batteries, and paste materials other than battery pastes. As feeder 6, other types of feeders such as volumetric, screw or vibratory feeders may be employed. Dewatering apparatus 67 may include other types of filtration and separation devices, such as centrifugal dewatering devices. These and other modifications of the invention may be made without departing from the scope of the invention as expressed in the appended claims.

We claim:

1. An apparatus for producing a battery paste material, comprising:
   a tank having a discharge outlet;
   a feeder disposed to feed a particulate solid into the tank;
   an inlet disposed to introduce water into the tank to form a mixture with the particulate solid;
   a conveyor having a porous conveyor belt disposed to receive the mixture from the discharge outlet of the tank on a surface of the porous conveyor belt;
   a filtration device capable of drawing a portion of the water from the mixture through the porous conveyor belt to form a paste material; and
   a paster disposed to receive paste from the filtration device and apply the paste to a series of grids.

2. The apparatus of claim 1, further comprising:
   a stirrer disposed in the tank;
   a heat control system capable of maintaining the temperature of the tank at a predetermined level; and
   a valve disposed in the discharge outlet, which valve prevents discharge of the mixture to the filtration device when closed, and permits such discharge when open.

3. The apparatus of claim 1, wherein the discharge outlet is centrally positioned on a side wall on the tank, and the tank further has a drain valve outlet disposed proximate the bottom of the tank for removal of material that accumulates at the tank bottom.

4. The apparatus of claim 1, further comprising a recycle line connecting the filtration device to the tank, and a pump disposed to recycle water drawn from the mixture by the filtration device through the recycle line to the tank.

5. The apparatus of claim 1, further comprising a line for conducting the mixture from the discharge outlet to the filtration device, the line including a discharge outlet valve for regulating flow of the mixture from the tank, and a heat exchanger that adjusts the temperature of the mixture before the mixture is fed to the filtration device.

6. The apparatus of claim 1, further comprising a line entering the tank near its bottom for introducing a gas into the tank.

7. The apparatus of claim 1, wherein the filtration device further comprises a vacuum filtration device.

8. The apparatus of claim 1, wherein the filtration device further comprises a filter press.

9. The apparatus of claim 8, further comprising:
a sensor disposed to measure the water content of the paste emerging from the press filtration device; and
a pressure control system for adjusting pressure exerted by the press filtration device to increase the pressure if the water content of the paste determined by the sensor is above a predetermined value, or decrease the pressure if the water content of the paste determined by the sensor is below a predetermined value.

10. The apparatus of claim 8, wherein the filter press includes a second conveyor belt disposed above the porous conveyor belt, whereby the mixture on the porous conveyor belt is press filtered between the conveyor belts as it moves along the conveyor belts.

11. The apparatus of claim 10, wherein the discharge outlet of the tank is disposed to deposit the mixture on an upper surface of the porous conveyor belt, and the filtration device further includes a vacuum filtration device disposed beneath the porous conveyor belt ahead of the press filtration device.

12. The apparatus of claim 10, further comprising:
a sensor disposed to measure the water content of the paste emerging from the press filtration device; and
a pressure control system for adjusting pressure exerted by the press filtration device to increase the pressure if the water content of the paste determined by the sensor is above a predetermined value, or decrease the pressure if the water content of the paste determined by the sensor is below a predetermined value, including a pair of rollers disposed in opposed positions above the second conveyor belt and below the porous belt to form a nip through which the mixture passes, and a controller connected to receive a signal from the sensor indicating the measured moisture level, which controller varies the pressure exerted by the rollers on the conveyor belts in response thereto.

* * * * *